June 13, 1967 P. KNUDSEN 3,325,137

FLEXIBLE VEHICLE SEAT MOUNT

Filed July 30, 1965 2 Sheets-Sheet 1

INVENTOR.
PATRICK KNUDSEN
BY
Berman, Davidson & Berman
ATTORNEYS

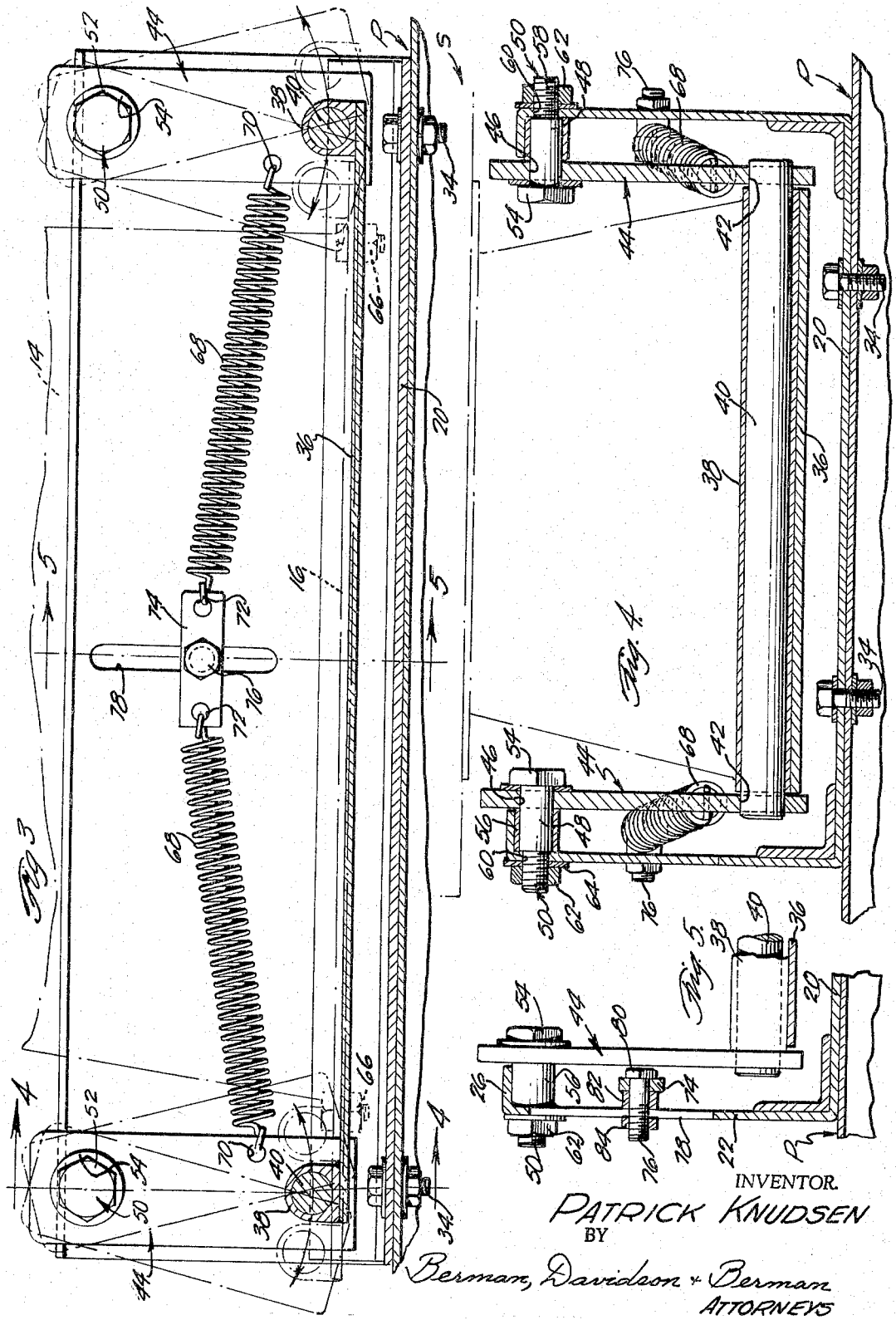

United States Patent Office 3,325,137
Patented June 13, 1967

3,325,137
FLEXIBLE VEHICLE SEAT MOUNT
Patrick Knudsen, Ozawkie, Kans.
(Box 26, Winchester, Kans. 66097)
Filed July 30, 1965, Ser. No. 476,066
6 Claims. (Cl. 248—424)

ABSTRACT OF THE DISCLOSURE

A shock absorbing vehicle seat structure composed of a fixed base and a seat carrying cradle which is articulated to the base to move both longitudinally and vertically, relative to the base, and restraining spring means connected to the base and to the seat cradle for cushioning movements of the seat cradle relative to the base, produced by movements of the vehicle on which the base is fixed.

This invention relates to a flexible vehicle seat mount.

Vehicle seats are usually mounted on vehicle floor pans or other rigid structure, so that, even though the seats have padding over spring construction, the driver or rider seated thereon is subjected to an undesirable amount of uncompensated shock and vibration, which is tiring, and which, in the case of the driver, imposes driving strains and fatigue which lessens the driver's efficiency and ability to drive safely over substantial periods of time. Whereas, in the cases of trucks, truck trailers and semi-trailers, the rigid mountings of their seat, coupled with the relatively great stiffness of the suspensions of such vehicles, the deleterious effects on drivers are multiplied and amplified.

The primary object of this invention is the provision of a flexible, shock-absorbing mount for vehicle seats, the presence of which reduces or substantially eliminates the above outlined objectionable characteristics of present vehicle seats.

Another object of the invention is the provision of a vehicle seat mount of the character indicated above, which has a base which is adapted to be bolted, or otherwise fixed to a vehicle floor pan, or other equivalent, the mount having a flexibly supported, spring-biased cradle, upon which the conventional seat is adapted to be secured, whereby vertical jolts and longitudinal jolts, are directly cushioned, and longitudinal stresses, incident to road shock, are translated into cushioned forward and rearward movements of the cradle, relative to the mount base, and combinations of these otherwise disturbing factors are vectored and cushioned.

In the drawings:

FIGURE 3 is a further enlarged vertical longitudinal section, taken through said mount, showing the cradle in normal position, in full lines, and the endwise open position, in phantom lines;

FIGURE 4 is a fragmentary vertical transverse section, taken on the line 4—4 of FIGURE 3, showing the associated seat in phantom lines; and, FIGURE 5 is a vertical transverse section taken on the line 5—5 of FIGURE 3.

Figure 2:
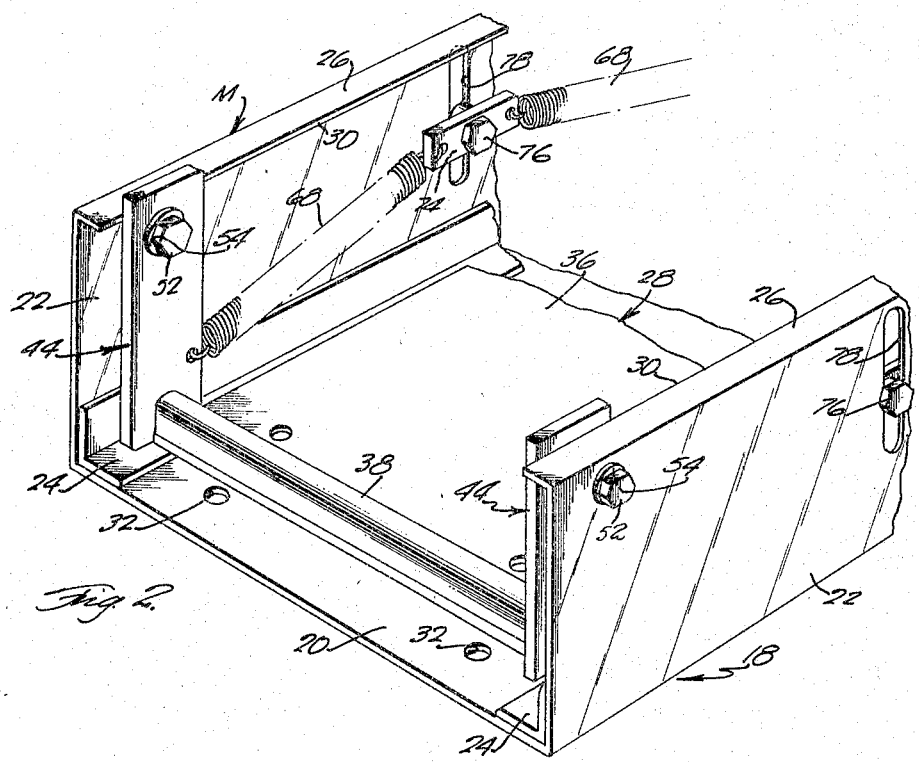
FIGURE 2 is an enlarged fragmentary perspective view of the mount, per se.

Referring in detail to the drawings, large S generally designates a conventional form of vehicle seat structure, having a horizontal seat 10, an upstanding back 12, and transversely spaced brackets 14 fixed to and extending downwardly from the seat 10, the brackets 14 having lateral longitudinal flanges 16 on their lower ends.

In accordance with the present invention, instead of the bracket flanges 16 being bolted or otherwise fixed upon the floor pan P, of an associated vehicle, the seat brackets are fixed upon a mount M, which is disposed between the seat structure S and the floor pan P.

The mount M comprises a U-shaped base 18, formed of relatively rigid sheet metal, having a flat horizontal cross member 20, and upstanding perpendicular side walls 22, extending along the side edges thereof. The meetings of the side walls 22 with the cross member 20 are reinforced and braced, by means of angle irons 24, extending therealong and fixed thereto. On and extending along the upper edges of the base side walls 22 are fixed, laterally inwardly extending flat flanges 26, which serve, not only to rigidify the side walls 22, but to act as spacers for a cradle 28, the flanges 26 having straight parallel inner edges 30. The cross member of the base 18 is provided with bolt holes 32, through which bolts 34 are adapted to be passed to fix the base 18, upon a vehicle floor pan P, as shown in FIGURE 3.

The cradle 28 comprises a horizontal plate 36, shorter and narrower than the base 18, upon which are suitably fixed, along the ends thereof, transverse bearing tubes 38, through which bearing shafts 40 extend. The bearing shafts 40 are shorter than the distance between the side walls 22 of the base 18 and are journalled, at their ends, through bores 42, formed in the lower ends of normally perpendicular, upstanding levers 44.

As indicated in FIGURES 4 and 5, the outer sides of the levers 44 are located close to the inner edges 30 of the spacer flanges 26, on the base side walls 22, and are formed adjacent to their upper ends, with bores 46. The bores 46 receive smooth portions 48 of pivot bolts 50, having heads 52 and washers 54, which bear against the inner sides of the levers. The bolts 50 have spacer sleeves 56 on their smooth portions 48, which bear, at related ends thereof, against the inner sides of the base side walls 22 and the outer sides of the levers 44. The bolts 50 have reduced threaded terminals 58 which extend downwardly through openings 60 provided in the base side walls 22, beneath the flanges 26, and the nuts 62 and washers 64, threaded on the terminals 58, bear against the outer sides of the side walls 22.

The cradle plate 36 is, by the above described arrangement, suspended in spaced relationship above the base cross member 20, and is free to be moved endwise, relative to the base 18, in opposite directions. Because of the pivotal relationships of the levers 44 to the base 18 and to the cradle plate 36, shiftings of the cradle toward either end of the base 18 are accompanied by elevations of the cradle plate 36, relative to the base, and return movements of the cradle plate 36, toward its normal or starting position, shown in full lines in FIGURE 3, are accompanied by depression of the cradle plate 36 toward the cross member 20 of the base plate 18.

Figure 1:
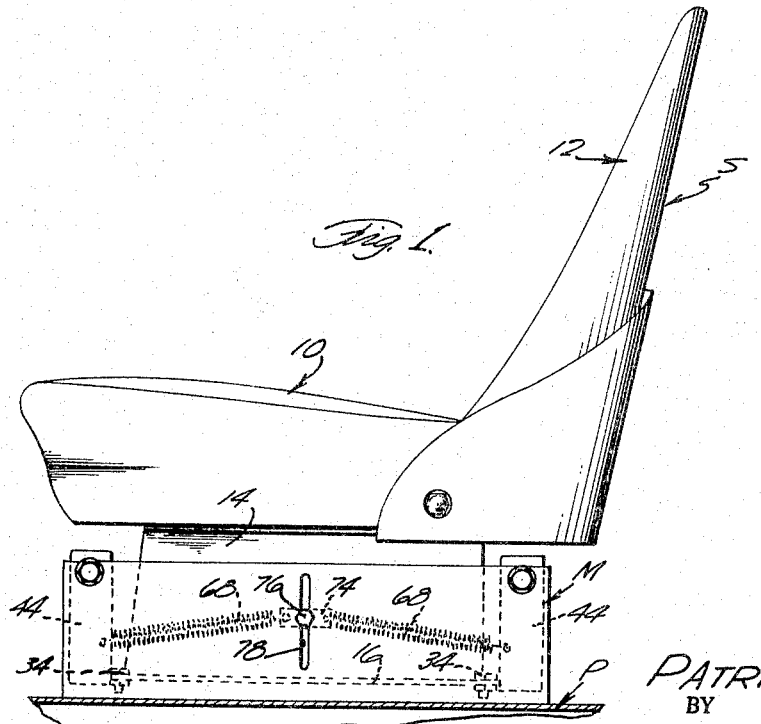
FIGURE 1 is a left hand side elevation, showing a conventional vehicle seat supported on the mount of the present invention, the latter being fixed to a vehicle floor pan.

As indicated in phantom lines in FIGURES 1, 3 and 5, the flanges 16 of the seat brackets 14 are bolted, as indicated at 66, to the cradle plate 36, preferably adjacent to the ends of the cradle plate 36 and the seat 10 of the seat structure S is thereby supported in spaced relationship above the base 18 as shown in FIGURE 1.

For resiliently and flexibly controlling the endwise shiftings of the cradle plate 36 and heads of the seat structure S, produced by road shocks imposed on the floor pan P, by the transit of a vehicle over a road surface, a double-acting spring means is operatively connected between the cradle 28 and the base 18.

The said spring means comprises longitudinal coil springs 68, secured, as indicated at 70, at their outer ends, to the levers 44, at locations below the vertical centers of the levers and adjacent to their inner edges, the springs 68 being secured at their inner ends, as indicated at 72, to the related ends of the horizontal bars 74. The bars 74 are centrally traversed by spring tension adjusting bolts 76, which extend slidably through vertically elongated perpendicular slots 78, formed in the base side walls 22, midway between the ends thereof.

As shown in FIGURE 4, the adjusting bolts 76 have heads 80, on their rear ends, which engage the inner sides of the bars 54, and have spacer collars 82 thereon, between the bars 74 and the inner surfaces of the base side walls 22 against which they are slidably engaged. Nuts 84 are threaded on the outer ends of the bolts 76, and bear slidably against the outer surfaces of the base side walls 22, so as to lock the bolts 76 in place and retain tension adjustments of the springs 68. Upward adjustment of the bolts 76 increase the tension of the springs.

In operation, road shocks sufficient to cause endwise shifting of the cradle 28, and hence of the seat structure S are restrained by the springs 68 adjacent to the end of the base 18 toward which the shift of the cradle takes place. As such a shift of the cradle takes place, the cradle rises, so that the springs 68 are stretched, cushioning action is imposed on the cradle 28, which prevents the original road shock from being imposed on the seat structure S.

The cradle 28 is returned toward its normal position, by the contraction of the springs 68, as the effect of the road shocks subsides, so that the springs 68 resume their normal similar and balanced tensions, ready to restrain and cushion any further shiftings of the cradle 28, in either direction.

I claim:

1. In combination, a fixed support subject to displacement shocks, a mount comprising a base fixed onto said support, a cradle overlying the base and articulated thereto at longitudinally spaced points along the base and the cradle for endwise movements relative to the base, and vertical movements relative to the base, said movements resulting from displacements of the support, spring means connected to the cradle adjacent to said points, said spring means being loosely connected to the base at a point spaced between said points, said spring means acting to resiliently restrain said movements of the cradle relative to the base and to return the cradle to a normal position relative to the base following movements of the cradle, and a seat structure fixedly secured upon the cradle.

2. In combination, a mount comprising a base adapted to be fixed to a support, a cradle overlying the base, means articulating the cradle to the base at points longitudinally spaced along the base and the cradle for endwise movements relative to the base and for vertical movements in opposite directions relative to the base, a seat structure fixedly supported upon the cradle, and spring means located between said points and severally connected to the cradle and the base for resiliently restraining said movements and for returning the cradle to a normal position relative to the base following such movements.

3. The combination of claim 2, wherein said base comprises a horizontal plate adapted to be fixed to a support, upstanding side walls on said plate, a cradle comprising a vertical lever means located at the ends of the base plate, said lever means being pivoted at their upper ends to the side walls at locations spaced above the base plate, said cradle having a horizontal plate to which the lower ends of the lever means are pivoted, the side walls of the base being formed intermediate their ends with vertical slideways, lockable slides confined in and adjustable vertically in said slideways, said spring means comprising springs stretched between the slides and the lever means.

4. The combination of claim 2, wherein said base comprises a horizontal plate adapted to be fixed to a support, upstanding side walls of said plate, a cradle comprising a vertical lever means located at the ends of the base plate, said lever means being pivoted at their upper ends to the side walls at locations spaced above the base plate, said cradle having a horizontal plate to which the lower ends of the lever means are pivoted, the side walls of the base being formed intermediate their ends with vertical slideways, lockable slides confined in and adjustable vertically in said slideways, said spring means comprising springs stretched between the slides and the lever means, the cradle plate having transverse bearing tubes fixed thereon adjacent to the ends thereof, bearing shafts extending through said tubes, said shafts being journalled at their ends in the lower ends of the lever means.

5. In combination of claim 2, wherein said base comprises a horizontal plate adapted to be fixed to a support, upstanding side walls on said plate, a cradle comprising a vertical lever means located at the ends of the base plate, said lever means being pivoted at their upper ends to the side walls at locations spaced above the base plate, said cradle having a horizontal plate to which the lower ends of the lever means are pivoted, the side walls of the base being formed intermediate their ends with vertical slideways, lockable slides confined in and adjustable vertically in said slideways, said spring means comprising springs stretched between the sides and the lever means, the cradle plate having transverse bearing tubes fixed thereon adjacent to the ends thereof, bearing shafts extending through said tubes, said shafts being journalled at their ends in the lower ends of the lever means, said lever means and the sides of the cradle plate being spaced from the inner sides of the base side walls, the cradle plate being spaced upwardly from the base plate.

6. In combination of claim 2, wherein said base comprises a horizontal plate adapted to be fixed to a support, upstanding side walls on said plate, a cradle comprising a vertical lever means located at the ends of the base plate, said lever means being pivoted at their upper ends to the side walls at locations spaced above the base plate, said cradle having a horizontal plate to which the lower ends of the lever means are pivoted, the side walls of the base formed intermediate their ends with vertical slideways, lockable slides confined in and adjustable vertically in said slideways, said spring means comprising springs stretched between the slides and the lever means, the cradle plate having transverse bearing tubes fixed thereon adjacent to the ends thereof, bearing shafts extending through said tubes, said shafts being journalled at their ends in the lower ends of the lever means, said lever means and the sides of the cradle plate being spaced from the inner sides of the base side walls, the cradle plate being spaced upwardly from the base plate, said slideways having lower ends spaced above the points of connection of the springs with the levers.

References Cited

UNITED STATES PATENTS

| | | | |
|---|---|---|---|
| 2,517,278 | 8/1950 | Benson | 297—282 |
| 2,638,965 | 5/1953 | Woodin | 248—399 |
| 2,850,073 | 9/1958 | Smith | 248—430 |

JOHN PETO, *Primary Examiner.*

CLAUDE A. LE ROY, *Examiner.*

J. F. FOSS, *Assistant Examiner.*